United States Patent
Wang et al.

(10) Patent No.: US 9,325,465 B2
(45) Date of Patent: Apr. 26, 2016

(54) METHOD AND BASE STATION FOR CONTROLLING INTERFERENCE

(75) Inventors: Hongwei Wang, Solna (SE); Jawad Manssour, Seoul (KR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 2 days.

(21) Appl. No.: 14/388,357

(22) PCT Filed: May 4, 2012

(86) PCT No.: PCT/SE2012/050474
§ 371 (c)(1),
(2), (4) Date: Sep. 26, 2014

(87) PCT Pub. No.: WO2013/165292
PCT Pub. Date: Nov. 7, 2013

(65) Prior Publication Data
US 2015/0063244 A1     Mar. 5, 2015

(51) Int. Cl.
*H04B 7/00* (2006.01)
*H04L 5/00* (2006.01)
*H04J 11/00* (2006.01)
*H04W 52/02* (2009.01)
*H04W 76/04* (2009.01)

(52) U.S. Cl.
CPC ........... *H04L 5/0032* (2013.01); *H04J 11/0056* (2013.01); *H04W 52/0216* (2013.01); *H04W 76/048* (2013.01)

(58) Field of Classification Search
CPC ...................... H04W 28/0289; H04W 52/0209
USPC .......... 370/310, 328, 329, 345, 349, 431, 462
See application file for complete search history.

(56) References Cited

U.S. PATENT DOCUMENTS

| | | | |
|---|---|---|---|
| 7,965,651 B2 * | 6/2011 | Du ...................... | H04W 76/048 370/252 |
| 8,437,285 B2 * | 5/2013 | Jokimies ........... | H04W 52/0274 370/278 |
| 8,483,690 B2 * | 7/2013 | Meshkati .............. | H04W 48/12 370/328 |

(Continued)

FOREIGN PATENT DOCUMENTS

| EP | 2 362 697 A1 | 8/2011 |
|---|---|---|
| WO | WO 2010/078476 | 7/2010 |
| WO | WO 2011/136519 | 11/2011 |

OTHER PUBLICATIONS

PCT International Search Report for International application No. PCT/SE2012/050474, Apr. 18, 2013.

(Continued)

Primary Examiner — Dmitry H Levitan
(74) Attorney, Agent, or Firm — Baker Botts, LLP

(57) ABSTRACT

A method and base station (600) of a first cell (602), for—controlling inter-cell interference in a cellular network when Discontinuous Reception, DRX, is applied for User Equipments, UEs. The base station selects a DRX scheme with active periods that are separated in time from active periods of a DRX scheme used for UEs in DRX mode in a neighboring second cell (806). The selected DRX scheme is then used for a first UE (604) in DRX mode in the first cell to avoid interference between transmissions of signals in the active periods to the first UE in the first cell and transmissions of signals in active periods to the UEs in the neighboring second cell.

15 Claims, 3 Drawing Sheets

(56) References Cited

U.S. PATENT DOCUMENTS

| | | | |
|---|---|---|---|
| 8,755,316 B2* | 6/2014 | Aschan | H04W 52/0216 370/310 |
| 9,066,261 B2* | 6/2015 | Ji | H04W 52/0216 |
| 2008/0186892 A1 | 8/2008 | Damnjanovic | |
| 2013/0315092 A1* | 11/2013 | Yu | H04W 52/0216 370/252 |
| 2014/0269598 A1* | 9/2014 | Lunden | H04W 72/1215 370/329 |

OTHER PUBLICATIONS

PCT International Preliminary Report on Patentability for International application No. PCT/SE2012/050474, Jun. 16, 2014.
3GPP TSG-RAN WG2 Meeting #77bis in Jeju, South Korea, Title: Using DRX with eICIC (R2-121658), Mar. 26-30, 2012.
3GPP TSG RAN WG1 Meeting #64 in Taipei, Taiwan, Title: HS-DDTx performance evaluation (R1-111058), Feb. 21-25, 2011.
Extended European Search Report for Application No./Patent No. 12875872.9-1852 / 2845336 PCT/SE2012050474, Nov. 23, 2015.

* cited by examiner

METHOD AND BASE STATION FOR CONTROLLING INTERFERENCE

PRIORITY

This nonprovisional application is a U.S. National Stage Filing under 35 U.S.C. §371 of International Patent Application Serial No. PCT/SE2012/050474, filed May 4, 2012 and entitled "Method and Base Station for Controlling Interference."

TECHNICAL FIELD

The present disclosure relates generally to a method and a base station serving a first cell in a cellular network, for controlling inter-cell interference in the cellular network such that interference between the first cell and one or more neighbouring cells may be reduced or avoided in a useful manner.

BACKGROUND

In cellular networks for wireless communication, interference often occurs in a cell caused by signals transmitted to or from User Equipments. UEs in nearby located cells, which is a well-known problem. In such a network, the available radio bandwidth is limited and in order to provide capacity for communications in the network having multiple cells, resources pertaining to radio bandwidth must be reused in cells at a sufficient mutual distance so as not to disturb communication for one another by interference. In this context, cells that are located near a serving cell are generally referred to as "neighbouring cells" and this term will be used here in the sense that transmissions in neighbouring cells may potentially disturb transmissions in the serving cell, and vice versa, thus causing interference. It should be noted that a neighbouring cell is not necessarily located right next to the serving cell but may be located one or more cells away, still causing interference.

FIG. 1 illustrates an example when interference occurs between two neighbouring cells A and B having radio coverage provided by a first base station 100A and a second base station 100B, respectively. In cell A, base station 100A sends data signals x to be received by a UE 102 in cell A. The figure also illustrates that the second base station 100B sends data signals y to be received by another UE 104 in cell B using downlink bandwidth resources that coincide with those used for the UE 102, and signal y may therefore be interfered by the downlink transmission signal x from base station 100A when received by the UE 104, indicated by an interfering signal x'.

This disclosure is relevant for cellular networks using any of the following radio access technologies: Orthogonal Frequency Division Multiplexing (OFDM), Single Carrier-Frequency Division Multiple Access (SC-FDMA), Orthogonal Frequency Division Multiple Access (OFDMA), Time Division Multiplex (TDM), and Frequency Division Multiplex (FDM). Further, resources pertaining to radio bandwidth will be referred to as "bandwidth resources" for short. Typically, bandwidth resources can be defined by a combination of frequency and time period. In systems of Long Term Evolution, LTE, the bandwidth resources are known as Physical Resource Blocks, PRBs, defined by frequency and time period, and in the following text bandwidth resources can be understood as PRBs when applied in an LTE context.

In recent years, the need for capacity in cellular networks has increased significantly as more users have become active, but also since more advanced and demanding services and UEs have been introduced on the market. Packet-switched communication is used extensively in modern networks such as LTE networks, which enables efficient use of the limited bandwidth resources since such resources are only occupied basically when there is data to send. Consequently, bandwidth resources are scheduled to UEs whenever needed for data transmission. For example, delay-sensitive services such as Voice over Internet Protocol, VoIP, put strict requirements on the scheduling process to cause a minimum of delays and allow playout of the data virtually in real-time. The quality of a voice call is basically determined by sound quality and delay which both may suffer from too much interference on transmitted voice data and control messages.

When a UE has data to send, e.g. speech data, it can send a so-called Scheduling Request, SR, to its serving base station which then responds by granting certain bandwidth resources for the UE to use for uplink transmission of the data, which is signalled from the base station in a so-called Scheduling Grant. On the other hand, when there is data to send from the base station to the UE, downlink bandwidth resources are allocated for the UE and a scheduling message, e.g. called Scheduling Assignment, is sent to the UE on a control channel, e.g. the so-called Physical Downlink Control Channel, PDCCH, ordering the UE to start receiving data on the allocated bandwidth resources defined by frequency and time. In either case, it is a requirement particularly for delay-sensitive services that the communication of data can start within a prescribed time limit, or "deadline", so as to achieve acceptable Quality of Service, QoS. If the time limit has expired for some data before transmission, that data may have to be discarded since it has become too "old" for playout which naturally could deteriorate the QoS.

In order to reduce battery consumption, UEs can enter so-called Discontinuous Reception, DRX, mode when being "asleep", i.e. when not receiving messages or data. The DRX mode involves passive and active periods according to a DRX scheme such that the UE is asleep during the passive periods and is turned on at regular intervals in the active periods e.g. for monitoring a prescribed downlink control channel, such as the PDCCH. This gives the base station an opportunity to tell the UE to start receiving data on a particular bandwidth resource that has been allocated and reserved for the UE when there is pending data to be sent from the base station to the UE.

FIG. 2 illustrates schematically such a DRX scheme with a repeated DRX cycle 200 comprised of a relatively short active period 200a when the UE wakes up and can monitor the above channel, and a longer passive period 200b when the UE is asleep and basically turned off. The active period 200a is sometimes referred to as the "On_Duration_Timer" which is typically one Transmission Time Interval, TTI, of 1 millisecond when the UE is active and able to receive messages or data transmitted from the base station. During the active period 200a, the UE can thus monitor the control channel in this way to see if the base station has any data to send. If not, the UE goes to sleep again during the passive period 200b only to wake up for the next active period according to the DRX scheme, and so forth.

A well-known problem in cellular networks is that the performance in communications may be degraded and network capacity may also be reduced, due to interference when the same bandwidth resources are reused in multiple nearby cells, e.g. as illustrated in FIG. 1. For example, when a UE in DRX mode wakes up to monitor control channel during the short active period it DRX scheme, the control channel may be interfered by transmissions in neighbouring cells at that moment such that the UE is not able to receive and properly decode a scheduling message directed to that UE on that control channel, e.g. a Scheduling Assignment on the PDCCH. When no acknowledgement of this message is received from the UE, the base station tries to send the same scheduling message once again during the next opportunity in the DRX scheme since the UE goes to sleep after each active period in the DRX scheme when remaining in the DRX mode.

However, the data which is ready to be sent to the UE will be delayed more and more for each attempt of getting across the scheduling message and the data may become too old for playout, particularly in the case of a delay-sensitive service such as VoIP, resulting in bad QoS as explained above. If the conveying of pending data to the UE fails repeatedly, the communication session will be severely disturbed and may even be interrupted altogether ultimately. This problem is particularly imminent for delay-sensitive services such as VoIP when used by UEs applying DRX at the same time for saving battery since the base station may not be able to get the scheduling message across to notify the UE to start receiving data in time, due to excessive interference on the control channel used.

Another problem associated with the above situation when the base station fails to get across a scheduling message due to interference is that bandwidth resources have been reserved, waiting to be used by the UE provided that it can properly decode the scheduling message. If this process takes too long and the pending data goes out of date and must be discarded, the unused bandwidth resources have been reserved in vain during all this time and will thus be wasted as no-one else can use them meanwhile, which is costly in terms of network capacity.

SUMMARY

It is an object of the invention to address at least some of the problems and issues outlined above and to enable decreased inter-cell interference for uplink transmissions of signals to UEs in DRX mode. It is possible to achieve these objects and others by using a method and a base station as defined in the attached independent claims.

According to one aspect, a method is provided in a base station serving a first cell in a cellular network, for controlling inter-cell interference in the cellular network when DRX is applied for UEs in the cellular network. In this method, the base station of the first cell selects a DRX scheme with active periods that are separated in time from active periods of a DRX scheme used for UEs in DRX mode in a neighbouring second cell. For example, the selected DRX scheme may be defined by a DRX cycle comprising an "On_Duration_Timer" of at least one Transmission Time Interval, TTI, when the UE is active and can receive signals from the base station. In the method, the base station of the first cell further uses the selected DRX scheme for a first UE in DRX mode in the first cell to avoid interference between transmissions of signals in active periods to the first UE in the first cell and transmissions of signals in active periods to the UEs in the neighbouring second cell.

According to another aspect, a base station is provided that serves a first cell in a cellular network and is configured to control inter-cell interference in the cellular network when DRX is applied for UEs in the cellular network. The base station comprises a logic unit adapted to select a DRX scheme with active periods that are separated in time from active periods of a DRX scheme used for UEs in DRX mode in a neighbouring second cell. The base station also comprises a first communication unit adapted to use the selected DRX scheme for a first UE in DRX mode in the first cell to avoid interference between transmissions of signals in active periods to the first UE in the first cell and transmissions of signals in active periods to the UEs in the neighbouring second cell.

It is an advantage with the above method and base station that they can be used to achieve less inter-cell interference between transmissions in different nearby cells to UEs in DRX mode. For example, when a UE in DRX mode wakes up to monitor a control channel during the active period in its DRX scheme, interference on the control channel by transmissions in neighbouring cells can thus be avoided such that the UE able to receive and properly decode a scheduling message when received on that control channel. Thereby it can also be avoided that data waiting in the base station to be sent to the UE is delayed too much due to repeated failed attempts of getting across the scheduling message, particularly when a delay-sensitive service such as VoIP is used. As a result, better QoS can be achieved for the UE.

The above method and base station may be configured and implemented according to different optional embodiments. In one possible embodiment, the DRX scheme selected such that its active periods are separated in time from active periods of UEs in DRX mode in each one of n neighbouring cells. For example, the base station of the first cell may receive preferred DRX schemes of the n neighbouring cells from base stations serving the neighbouring cells, and in that case selection of the DRX scheme for the first cell may be coordinated with the n neighbouring cells by selecting the DRX scheme not to coincide with the received DRX schemes of the neighbouring cells. The base station of the first cell may also send its selected DRX scheme to base stations serving the n neighbouring cells to enable coordination of DRX schemes for the n neighbouring cells.

In further possible embodiments, the selected DRX scheme may be used also for other UEs in DRX mode in the first cell such that said first UE shares bandwidth resources with the other UEs during said active periods in the selected DRX scheme. In that case, the first UE and other UEs in DRX mode in the first cell may be time-multiplexed during the active periods in the selected DRX scheme and can receive signals from the base station at separate occasions. Thereby, the selected DRX scheme can be used for serving a substantial quantity of UEs in DRX mode in the cell without the risk of collisions.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Figure 1:
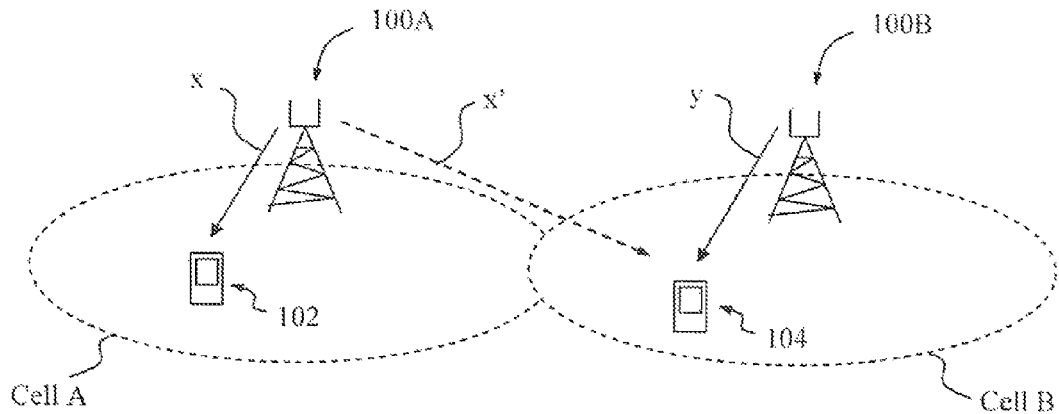
FIG. 1 is a communication scenario illustrating how inter-cell interference cam occur, according to the prior art.

Briefly described, a solution is provided to enable less inter-cell interference between transmissions in different nearby cells to UEs in DRX mode. This can be achieved by coordinating the usage of DRX schemes for UEs in mutually neighbouring cells such that the active DRX periods for downlink transmission of signals to UEs are separated in time between different cells. The base stations serving the cells thus take turns in transmitting, one at a time, signals to UEs in their respective cells. In the following text, it is often implied that different base stations serve different cells, even though a base station, such as a NodeB or e-NodeB, may serve more than one cell such as a set of adjacent sector cells, depending on the network configuration. Transmission of signals implies the sending of any data or control messages.

The solution will now be explained in terms of a procedure with actions executed in a base station, and with reference to the flow chart in FIG. 3. The base station is serving a "first" cell and it can be assumed that if no coordination of DRX schemes is made with one or more other cells there is a risk of interference between downlink transmissions to UEs in DRX mode in the first cell and in at least one neighbouring cell which will be referred to as a "second" cell.

Further, a "DRX scheme" is basically defined in this context by the timing of active DRX periods in which downlink transmissions to UEs are allowed and can be executed. Even though only one neighbouring cell is referred to, it should be understood that the following actions can be applied as well for any number of plural neighbouring cells where there is a potential risk of interfering with downlink transmissions in the first cell. In this context, interference may occur in either direction such that transmissions in the first cell may disturb, and/or be disturbed by, transmissions in the second cell.

A first action 300, which could basically be optional, illustrates that it may be decided or detected that it would be helpful or effective to reduce or avoid interference for a first UE in DRX mode in the first cell, between downlink transmissions to the first UE and to UEs in DRX mode in the neighbouring second cell. For example, the first UE may be detected to be sensitive to interference such as in the case of a cell edge UE being located close to the cell border and thus to a neighbouring cell but relatively far from its serving base station which means that the UE may experience "bad" channel conditions and needs extra power in the downlink transmissions which could increase the risk for interference. Alternatively or additionally, it may be detected that the first UE is currently using a VoIP service which is a real-time service highly dependent on data delivery without much delay, as explained above. On the other hand, the following actions be executed anyway for any UE(s), more or less "by default".

In a further action 302, the base station of the first cell selects a DRX scheme with active periods that are separated in time from active periods of a DRX scheme used for UEs in DRX mode in the neighbouring second cell. The selected DRX scheme may be defined by a DRX cycle comprising the above-mentioned "On_Duration_Timer" of at least one TTI, during which the UE is active and can receive signals from the base station. This action thus implies that a certain coordination is sought with the usage of DRX scheme in the second cell to avoid that their active DRX periods coincide. This can be done in different ways, e.g. by means of signalling between the base stations of the first and second cells, which in the case of LTE can made over the so-called X2-interface commonly employed between base stations.

As mentioned above, this coordination of DRX schemes may be done with any number of neighbouring cells. In this action, the DRX scheme may thus be selected such that its active periods are separated in time from active periods of UEs in DRX mode in each one of n neighbouring cells. The coordination may be carried out as follows. The base station of the first cell may receive preferred DRX schemes of the n neighbouring cells from base stations serving the n neighbouring cells, thus indicating that they intend or propose to use the preferred DRX schemes for their UEs. The base station the first cell can then select the DRX scheme such that it does not coincide with the received preferred DRX schemes. Alternatively or additionally, the base station of the first cell may send the selected DRX scheme to stations serving the n neighbouring cells, which enables the latter base stations to select DRX schemes for their cells that do not coincide with the DRX scheme that was selected and sent by the base station of the first cell.

A final action 304 illustrates that the base station of the first cell uses the selected DRX scheme for, at least, the first UE in DRX mode in the first cell, to avoid interference between transmissions of signals in active DRX periods to the first UE in the first cell and transmissions of signals in active DRX periods to the UEs in at least the neighbouring second cell. In this way, it is possible to keep the inter-cell interference at bay such that any downlink transmission of signals to at least the first UE, and/or to UEs in the second cell, will potentially be more successfully received and decoded. As a result, delays or failure in delivery of data or messages can be minimized or reduced, which generally provides for better QoS and/or more efficient use of bandwidth resources and network capacity.

As indicated above, the selected DRX scheme may be used also for other UEs in DRX mode in the first cell. In that case, the first UE will share bandwidth resources with the other UEs during the active DRX periods in the selected DRX scheme. For example, the different UEs may be multiplexed in a suitable manner during the available bandwidth resources according to the active periods in the DRX scheme such that they will be scheduled to take turn in receiving signals during different active periods. In other words, the first UE and other UEs in DRX mode in the first cell may be time-multiplexed during the active periods in the selected DRX scheme and can receive signals from the base station at separate occasions. In a simplified example when there are, say, 8 active periods in a DRX cycle and 8 UEs in DRX mode to serve in the first cell, the 8 UEs can be scheduled to have their "On_Duration_Timer" in one active DRX period each in the DRX cycle in which they can receive or monitor any downlink transmitted signals. Further illustrative but non-limiting examples will be provided later below.

Figure 2:
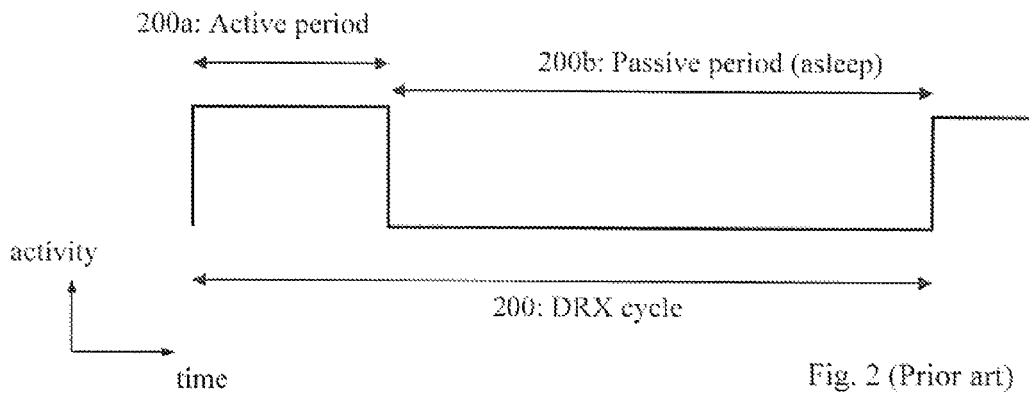
FIG. 2 is a schematic diagram illustrating a conventional DRX scheme, according to the prior art.
Figure 4A:
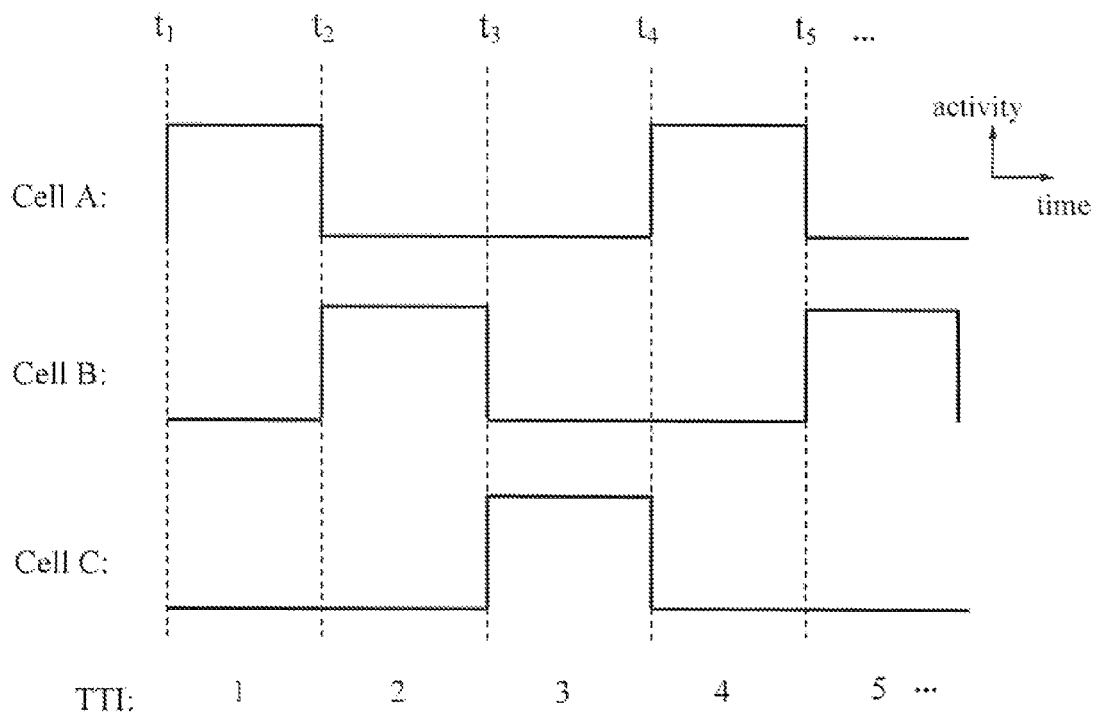
FIGS. 4a-c are diagrams illustrating an example of coordinating DRX schemes in three base stations A-C when the solution is used, according to further possible embodiments.
Figure 4B:
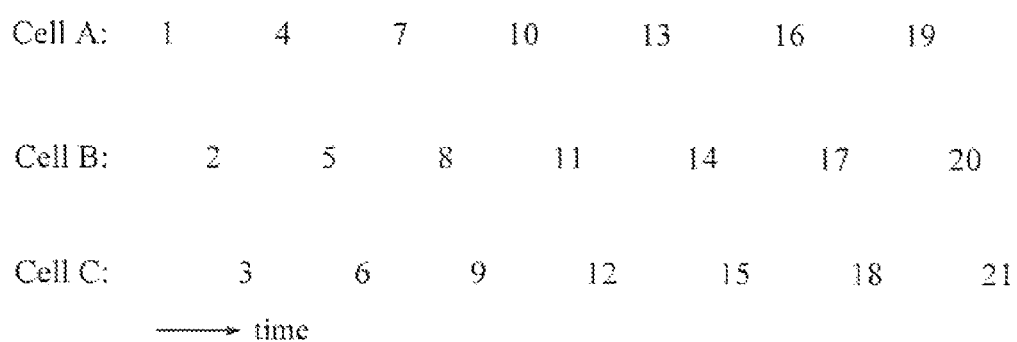
Figure 4C:
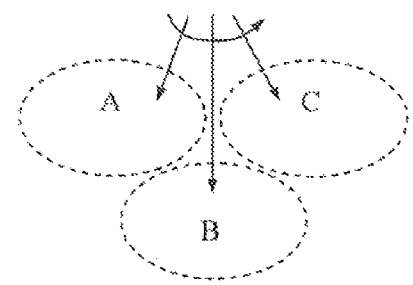

FIG. 4a illustrates an example of how DRX schemes can be selected for three mutually neighbouring cells A, B and C such that their active DRX periods do not coincide. Further, FIG. 4b illustrates schematically how the active DRX periods take place in the cells in more detail, while FIG. 4c illustrates the three cells A, B and C and that the active periods in their respective DRX schemes occur one after another in the cells, as schematically indicated by the arrows. In FIG. 4a, the active and passive DRX periods of the cells are shown as full drawn lines indicating activity/inactivity over time, basically in a corresponding manner as in FIG. 2. The DRX schemes are defined in terms of TTIs 1, 2, 3, . . . occurring between times $t_1$ and $t_2$, $t_2$ and $t_3$, $t_3$ and $t_4$, respectively, and so forth.

Figure 3:
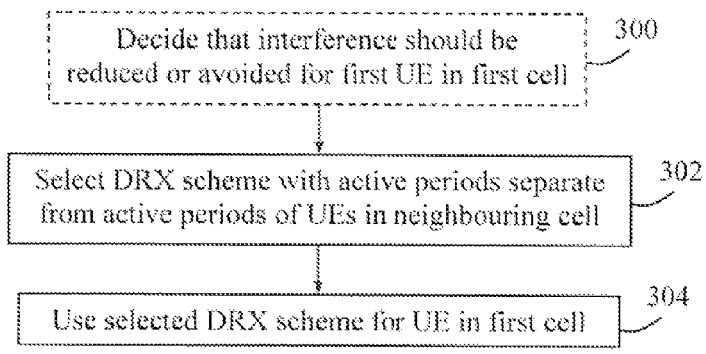
FIG. 3 is a flow chart illustrating a procedure in a base station, according to possible embodiments.

In this example, DRX schemes have been selected and are used in the cells A-C in a manner basically following the procedure of FIG. 3. Without limitation, this procedure may be executed in each of three base stations serving the cells A-C, respectively, or in a common node that controls transmission in the cells, e.g. a base station, a Radio Network Controller (RNC) or the like. The first shown TTI 1 is available for downlink transmissions in cell A while the other cells B and C should be silent by not transmitting. The next TTI 2 is available for downlink transmissions in cell B while the other cells A and C should be silent, and the next TTI 3 is available for downlink transmissions in cell C while the other cells A and B should be sent. This pattern is then repeated for the subsequent TTIs 4, 5, . . . whereby the active DRX periods will never coincide between the cells. In this example, the same repetition pattern is used by each cell with a mutual relative displacement or offset of one TTI, although any other mutually different repetition patterns can be used by the cells, without limitation, as long as their active DRX periods are basically separated in time and do not coincide.

FIG. 4*b* illustrates in more detail which TTIs are active, i.e. available for downlink transmissions, for the different cells, following the DRX schemes indicated in FIG. 4*a*. Accordingly, TTI 1 is reserved for transmissions in cell A, TTI 2 is reserved for transmissions in cell B, TTI 3 is reserved for transmissions in cell B, and so forth. As a result, cell A has the TTIs 1, 4, 7, 10, 13, 16 and 19 available for downlink transmissions to UEs in DRX mode. Cells B and C have likewise a series of TTIs available for downlink transmissions, as shown in the figure.

The selection of DRX scheme thus dictates more or less when a UE is to be scheduled, e.g. for monitoring a downlink control channel such as the PDCCH. This means that the base station can, by appropriately setting the duration and location of the "On_Duration_Timer" of a certain DRX cycle, to also separate the transmission to different UEs in the cell in time by suitable time-multiplexing. In one example, the DRX cycle may be 20 ms, which incidentally is related to the VoIP packet generation frequency, and the On_Duration_Timer may be 1 ms which is a common length in general. It may further be assumed that a base station can process, e.g. perform link adaptation and scheduling, 4 UEs jointly in a TTI of 1 ms. This means that over the duration of the DRX cycle of 20 ms, 80 different UEs in three cells can be time-multiplexed as follows. In each TTI, an On_Duration_Timer will be active in one of the three cells during which 4 UEs can be processed. These 4 UEs will thus wake up and share the bandwidth resources during that TTI, while the other 76 UEs are asleep.

The load of UEs engaged e.g. in a VoIP service may sometimes be very high such that overlapping On_Duration_Timer, i.e. active periods in the DRX cycle, are needed for more UEs on a dynamic basis. In such a case, overlapping On_Duration_Timer might still be used in neighbouring cells by avoiding use of the same time location of the On_Duration_Timer in the cells. This could be done using known Inter-Cell Interference Coordination (ICIC) techniques. One such example is that if the base stations of two cells A and B decide to use DRX schemes for their UEs with the On_Duration_Timer on, say, TTIs 5, 6, 7, 8 and 9, then the base station of cell A can start using the On_Duration_Timer primarily on TTIs of increasing index e.g. by starting with TTI 5, and then TTI 6 in case it has more UEs, etc. At the same time, the base station of cell B can estimate how many TTIs needs for serving some predicted number of UEs and choose the TTIs of decreasing index for the On_Duration_Timer, starting from the last "available" TTI 9, then TTI 8 it needed, etc. In this way, simultaneous usage of TTIs will tend to occur only during high load in both cells but not otherwise.

Figure 5:
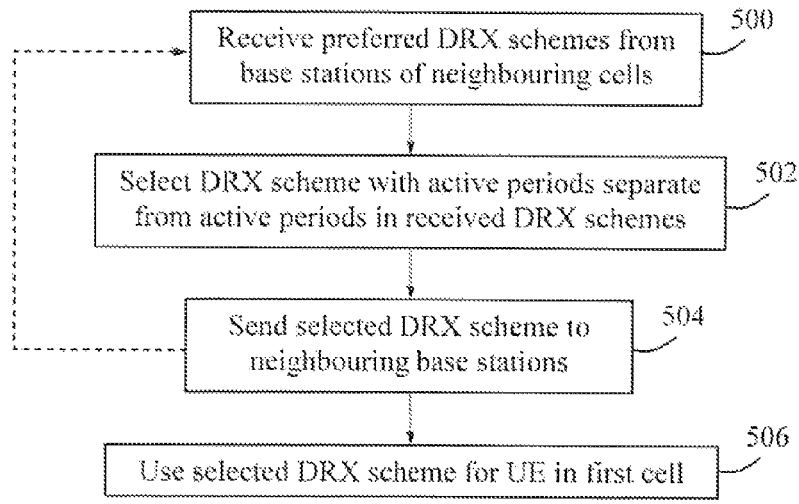
FIG. 5 is a flow chart illustrating a more detailed procedure in a base station, according to further possible embodiments.

An example of how the base station of the first cell can communicate with other base stations serving neighbouring cells in order to coordinate the usage of non-coinciding DRX schemes, will now be described with reference to the flow chart in FIG. 5. A 500 illustrates that the base station of the first cell receives preferred DRX schemes of the n neighbouring cells from base stations serving the n neighbouring cells. The base station of the first cell then selects the DRX scheme with active periods that are separate from the active periods in the received DRX schemes, i.e. such that the selected DRX scheme does not coincide with the received preferred DRX schemes, in a further action 502.

Another action 504 illustrates that the base station of the first cell may also send the selected DRX scheme to the base stations serving the n neighbouring cells, which those base stations can use for coordination of DRX schemes. A last shown action 506 illustrates that the base station of the first cell uses the selected DRX scheme for a first UE in DRX mode in the first cell, basically corresponding to action 304 above.

Figure 6:
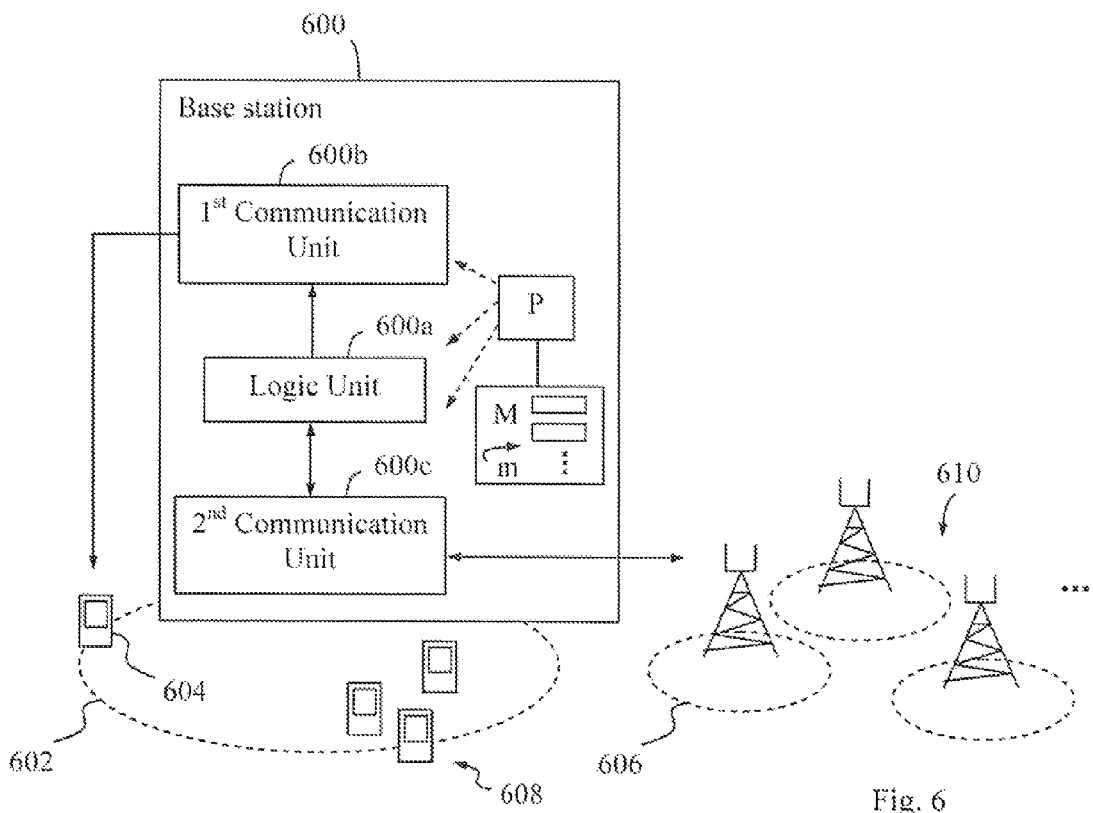
FIG. 6 is a block diagram illustrating a base station in more detail, according to further possible embodiments.

A detailed but non-limiting example of how a base station can be configured to accomplish the above-described solution, is illustrated by the block diagram in FIG. 6. The base station 600 is serving a first cell 602 in a cellular network, and is configured to handle inter-cell interference in the cellular network when Discontinuous Reception, DRX, is applied for User Equipments, UEs, in the cellular network, e.g. according to the procedures described above for any of FIGS. 3-5, respectively. The base station 600 will now be described in terms of a possible example of employing the solution.

The base station 600 comprises a logic unit 600*a* adapted to select a DRX scheme with active periods that are separated in time from active periods of a DRX scheme used for UEs, not shown, in DRX mode in a neighbouring second cell 606. The base station 600 further comprises a first communication unit 600*b* adapted to use the selected DRX scheme for a first UE 604 in DRX mode in the first cell to avoid interference between transmissions of sign in active periods to the first UE in the first cell 602 and transmissions of signals in active periods to the UEs in a neighbouring second cell 606.

The base station 600 may also comprise a second communication unit 600*c* adapted to communicate with the base station serving the second cell 606 and with other base stations serving further neighbouring cells 610, e.g. over an X2-interface, according to embodiments described below.

The above base station 600 and its functional units 600*a-c* may be configured or adapted to operate according to various optional embodiments. In a possible embodiment, the logic unit 600*a* may be further adapted to select the DRX scheme such that its active periods are separated in time from active periods of UEs in DRX mode in each one of n neighbouring cells 610. In another possible embodiment, the second communication unit 600*c* may be adapted to receive preferred DRX schemes of the n neighbouring cells 610 from base stations serving the n neighbouring cells. In this case, the logic unit 600*a* may be further adapted to coordinate selection of the DRX scheme with the n neighbouring cells by selecting the DRX scheme not to coincide with the received preferred DRX schemes. The second communication unit 600*c* may be further adapted to send the selected DRX scheme to the base stations serving the n neighbouring cells 610 to enable coordination of DRX schemes for the n neighbouring cells.

The first communication unit 600*b* may be further adapted to use the selected DRX scheme also for other UEs 608 in DRX mode in the first cell 602. In that case, the first UE may share bandwidth resources with the other UEs 608 during said active periods in the selected DRX scheme. Further, the first communication unit 600*b* may be further adapted to time-multiplex said first UE and other UEs in DRX mode in the first cell during the active periods in the selected DRX scheme to receive signals from the base station at separate occasions It should be noted that FIG. 6 illustrates various functional units in the base station 600 and the skilled person is able to implement these functional units in practice using suitable software and hardware. Thus, the solution is generally not limited to the shown structures of base station 600, and the functional units 600a-c may be configured to operate according to any of the features describe in this disclosure, where appropriate.

The functional units 600a-c described above can be implemented in the base station 600 by means of program modules of a respective computer program comprising code means which, when run by a processor "P" cause the base station 600 to perform the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product in the base station 600 in the form of a memory "M" having a computer readable medium and being connected to the processor P. The computer program product or memory M thus comprises a computer readable medium on which the computer program is stored e.g. in the form of computer program modules "m". For example, the memory M may be a flash memory, a Random-Access Memory (RAM), a Read-Only Memory (ROM) or are Electrically Erasable Programmable ROM (EEPROM), and the program modules m could in alternative embodiments be distributed on different computer program products in the form of memories with the base station 600.

While the solution has been described with reference to specific exemplary embodiments, the description is generally only intended to illustrate the inventive concept and should not be taken as limiting the scope of the solution. For example, the terms "base station", "user equipment", "neighbouring cell", "DRX mode" and "DRX scheme" have been used throughout this description, although any other corresponding nodes, functions, and/or parameters could also be used having the features and characteristics described here. The solution is defined by the appended claims.

The invention claimed is:

1. A method in a base station serving a first cell in a cellular network, for controlling inter-cell interference in the cellular network when Discontinuous Reception, DRX, is applied for User Equipments, UEs, in the cellular network, the method comprising:
   selecting a DRX scheme with active periods that are separated in time from active periods of a DRX scheme used for UEs in DRX mode in a neighbouring second cell, and
   using the selected DRX scheme for a first UE in DRX mode in the first cell to avoid interference between transmissions of signals in active periods to the first UE in the first cell and transmissions of signals in active periods to the UEs in the neighbouring second cell.

2. A method according to claim 1, wherein the DRX scheme is selected such that its active periods are separated in time from active periods of UEs in DRX mode in each one of n neighboring cells, wherein n is a natural number.

3. A method according to claim 2, wherein preferred DRX schemes of the n neighbouring cells are received from base stations serving the n neighbouring cells, and selection of the DRX scheme is coordinated with the n neighbouring cells by selecting the DRX scheme not to coincide with the received DRX schemes of the n neighbouring cells.

4. A method according to claim 2, wherein the selected DRX scheme is sent to base stations serving the n neighbouring cells to enable coordination of DRX schemes for the n neighbouring cells.

5. A method according to claim 1, wherein the selected DRX scheme is defined by a DRX cycle comprising an "On_Duration_Timer" of at least one Transmission Time Interval, TTI, when the UE is active and can receive signals from the base station.

6. A method according to claim 1, wherein the selected DRX scheme is used also for other UEs in DRX mode in the first cell such that said first UE shares bandwidth resources with the other UEs during said active periods in the selected DRX scheme.

7. A method according to claim 6, wherein said first UE and other UEs in DRX mode in the first cell are time-multiplexed during the active periods in the selected DRX scheme and can receive signals from the base station at separate occasions.

8. A method according to claim 1, wherein the first UE in the first cell is currently using a Voice over Internet Protocol, VoIP, service.

9. A base station serving a first cell in a cellular network, and configured to control inter-cell interference in the cellular network when Discontinuous Reception, DRX, is applied for User Equipments, UEs, in the cellular network, the base station comprising:
   a logic unit adapted to select a DRX scheme with active periods that are separated in time from active periods of a DRX scheme used for UEs in DRX mode in a neighbouring second cell, and
   a first communication unit adapted to use the selected DRX scheme for a first UE in DRX mode in the first cell to avoid interference between transmissions of signals in active periods to the first UE in the first cell and transmissions of signals in active periods to the UEs in the neighbouring second cell.

10. A base station according to claim 9, wherein the logic unit is further adapted to select the DRX scheme such that its active periods are separated in time from active periods of UEs in DRX mode in each one of n neighboring cells, wherein n is a natural number.

11. A base station according to claim 10, further comprising a second communication unit adapted to receive preferred DRX schemes of the n neighbouring cells from base stations serving the n neighbouring cells, wherein the logic unit is further adapted to coordinate selection of the DRX scheme with the n neighbouring cells by selecting the DRX scheme not to coincide with the received preferred DRX schemes.

12. A base station according to claim 10, wherein the second communication unit is further adapted to send the selected DRX scheme to base stations serving the n neighbouring cells to enable coordination of DRX schemes for the n neighbouring cells.

13. A base station according to claim 9, wherein the selected DRX scheme is defined by a DRX cycle comprising an "On_Duration_Timer" of at least one Transmission Time Interval, TTI, when the UE is active and can receive signals from the base station.

14. A base station according to claim 9, wherein the first communication unit is further adapted to use the selected DRX scheme also for other UEs in DRX mode in the first cell such that said first UE shares bandwidth resources with the other UEs during said active periods in the selected DRX scheme.

15. A base station according to claim 14, wherein the first communication unit is further adapted to time-multiplex said first UE and other UEs in DRX mode in the first cell during the active periods in the selected DRX scheme to receive signals from the base station at separate occasions.

* * * * *